3,424,399
INTERNAL COILING MACHINE
John C. Knox, 5830 Bellflower Drive,
Littleton, Colo. 80120
Filed May 10, 1967, Ser. No. 637,479
U.S. Cl. 242—83   8 Claims
Int. Cl. B21c 47/28

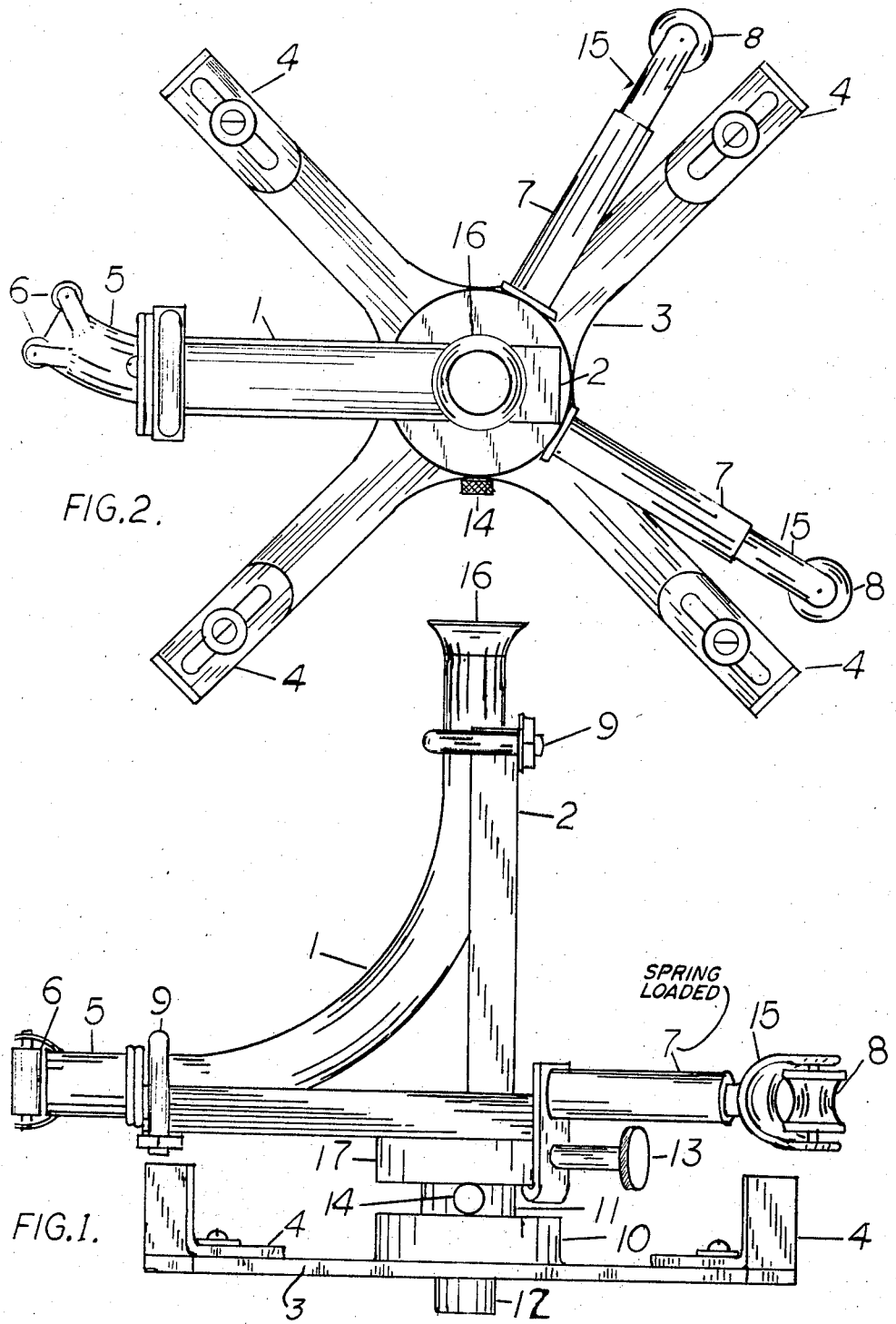

ABSTRACT OF THE DISCLOSURE

An internal coiling machine having a frame supporting a curved deflector. A cup-shaped member is rotatably mounted on the frame and supports spring-loaded arms to hold the material in place after coiling in a container.

---

This invention relates to improvements for an internal coiling machine.

The main object of the invention is to provide improvements in a machine for coiling continuous, elongated materials into a stationary container from a centrally located point inside of the exterior limits of such a container so that the coiled strands of the materials are placed evenly and neatly inside of the container to conform with the shape of the container and thereby permit easy, tangle-free uncoiling of said materials.

Another object of this invention is to broaden and expand the uses of coiling machinery for internally coiling elongated materials so that special framing included with such machinery will permit the use of discarded objects such as used vehicle tire casings to serve as containers for storage or packing.

Another object is to make possible a machine for loading coilable materials of various sizes and ductilities into economically prefabricated containers of differing sizes, by utilizing one of many particular orifices removably attached to such machine to achieve such loading, rather than to surround previously coiled materials with packing or storage enclosures, crates or cartons fabricated to fit the coiled materials according to the size of the coils.

Another object is to provide a means for the storage or packing of coilable elongated materials from a remote point or location by feeding said materials through suitable guides or tubing to an internal coiling machine and thence into any fixed or stationary container by providing for the coiling action through a pushing force applied to the coilable materials instead of pulling, leading, or dragging these same materials by means of power supplied to reels or rotating containers, thus making it virtually impossible to force one coil of material beneath other coils where it might become tangled during the removal process.

A still further object is to provide in an internal coiling machine a plurality of spring loaded rollers each of which is connected to a follow arm that rotates as part of the coiling machine from the same pivotal point to serve as a means of packing the various coils into the contour of the container and to restrain these coils from falling inward during the coiling process due to possible variations in the flexibility of the coilable materials.

An advantage of this invention is the economy made possible through the use of discarded and worn tire casings or other low cost articles for storage and shipping containers.

A still further advantage of this invention is that by making possible the use of discarded tire casings as shipping containers, greater protection is thereby provided by rubber enclosures for coilable materials which otherwise would be shipped or stored in containers made of rigid materials, and hence subject to breakage, splintering, or other damage often occurring to such rigid containers.

In the accompanying drawings:

FIGURE 1 is an elevation. FIGURE 2 is a top plan view. A distributor tube 1 is suitably designed, shaped and bent to a form that most easily permits the transmission of various coilable materials and their deflection at angles of about 90° to the vertical axis of shaft 12, these materials entering at mouth 16 and issuing therefrom through deflector 5. The distributor tube 1 is held firmly in a frame 2 by means of U-bolts 9.

The frame 2 has a shaft 12 which extends downward from cup flange 17 where it is positioned in bearing race extension 11 by means of shaft set screw 14. The shaft 12 may then be rotated in either direction within the bearing which is contained in the bearing sleeve 10. The bearing sleeve 10 is affixed to a container mounting frame 3 which has suitable clamps 4 intended for holding a container in the proper position with relation to the rotating action of the distributor tube 1.

Spring-loaded follow arms 7 containing brackets 15 and rollers 8 are radially adjustable around annular cup flange 17 where they are held in position by means of set screws 13. The design and shape of the follow arm rollers 8, the tensions of the compression spring held in the follow arm base 7, and the positioning as well as the quantity of follow arms required are intended to be modified and altered to suit the various types of coilable materials used in this device.

Deflector 5 may be removed from distributor tube 1 and replaced with its direction reversed so as to change the direction of coiling within the container.

Rollers 6 which are located on the impinging edges of deflector 5 are intended to ease the friction of coilable materials moving thru the orifice while entering or leaving the container.

The activating force for operation of this device is that force which is applied to the coilable material to cause it to enter the mouth 16 and hence to issue through orifice of deflector 5. The coilable material leaving deflector 5 continues outward in an oblique direction to the walls of any stationary container until it makes contact with the container wall. The impingement of the coilable materials against the wall of the container causes backward motion to take place in the distributor tube 1 thus setting up a backward rotating motion as the coilable material continues to push against the walls of the container or against previously coiled lengths of the material in the container. The purpose of the follow arm rollers is to hold in place the material after it has been coiled in the container, although this feature is not always necessary with certain types of coilable material having sufficient tensile strength to maintain fixed position inside of the container during the coiling process.

When the coilable material is removed thru this device by pulling the material backward out of mouth 16, the direction of the rotating distributor tube is reversed, and instead of moving backward it then moves forward with the deflector 5 acting as a scoop, always lifting the last or top coil and starting it through the distributor tube 1 for quick and easy emptying of the container.

The accompanying drawing is not intended to limit the size or scope of the depicted improvements to the design or shape as shown, but to show in general how these improvements broaden and enhance the operation of internal coiling machines, as the various pertinent dimensions would necessarily be changed to suit the type and size of coilable material being handled.

In particular, referring to tube distributor 1, no limit is placed on the length of tubing between the mouth 16 and the start of radial bend in the tubing, as this length would be curtailed only by practical limitations imposed by type of material being handled and by other physical aspects of each application.

I claim:
1. Improvements for an internal coiling machine comprising:
   (a) a rigid frame-like support to serve as a base for positioning and holding the components of a coiling machine,
   (b) a curved length of tubing for containably guiding the passage of coilable material through its interior,
   (c) a removable curved deflector attachable to the end of a length of curved tubing,
   (d) a rotatably mounted sub-frame containing one or more centrally located bearing sleeves with bearings for rotatively accommodating a shaft extension in various settings,
   (e) a cup-shaped member on the shaft having an annular flange to serve as a base against which set-screws may be positioned and tightened,
   (f) a shaft made attachable to the cup-shaped member and moveably fastened to sub-frame.

2. Improvement for an internal coiling machine defined by claim 1 including a trumpet or funnel shaped opening at the mouth or entrance of the curved tubing in such a machine.

3. Improvements for an internal coiling machine as defined by claim 1 including a plurality of rollers affixed to the terminal edges of its tubing orifice and elsewhere as needed for reducing friction of materials passing thru and out of tubing.

4. Improvements for an internal coiling machine as defined by claim 1 including a plurality of follow arms moveably attachable to annular flange of cup, each containing a spring loaded roller that rotates with tube orifice for nesting and packing of material while this material is being coiled inside a stationary container.

5. Improvements for an internal coiling machine as defined by claim 1 including one or more adjustable bearing race extension collars with set screws for holding shaft to rotative bearing members, thereby permitting a choice of axial settings of the collars within the limits of the shaft's length.

6. Improvements for an internal coiling machine as defined by claim 1 including a plurality of positioning clamps affixed moveably or permanently to sub-frame for locating and maintaining desired positions of stationary containers being used in conjunction with such a coiling machine.

7. Improvements for an internal coiling machine as defined by claim 1 including a specific means for coiling certain materials inside of used vehicle tire casings for purposes of storage or transportation through adjustment of shaft so that the tube deflector can be centered parallel to axis in middle of tire casing opening where this centered position may vary in accordance with girth of different sizes of casings.

8. Improvements for an internal coiling machine as defined by claim 1 including a general means of coiling various materials within certain stationary containers by providing means for adjustments necessary to accommodate the coiling of various materials having different characteristics, such adjustments including the reversibility of the deflector, the changeability of the deflector by substituting other deflectors having different degrees of deflection, and the changeability of tubing members to provide for bends of lesser or greater radius.

References Cited

UNITED STATES PATENTS

| | | | |
|---|---|---|---|
| 373,463 | 11/1887 | Lenox | 242—83 X |
| 2,220,481 | 11/1940 | Fritts | 242—83 |

FRANK J. COHEN, *Primary Examiner.*

NATHAN L. MINTZ, *Assistant Examiner.*